United States Patent [19]

Chernoff et al.

[11] 4,426,593
[45] Jan. 17, 1984

[54] UNIVERSALLY MOUNTABLE MOTORS

[75] Inventors: Edward A. Chernoff, Brookville; Paul Levy, Lindenhurst, both of N.Y.

[73] Assignee: Motors & Armatures, Inc., Hauppauge, N.Y.

[21] Appl. No.: 329,496

[22] Filed: Dec. 10, 1981

[51] Int. Cl.³ .............................................. H02K 5/00
[52] U.S. Cl. ........................................ 310/91; 310/42; 310/71; 248/669; 248/675
[58] Field of Search ..................... 310/91, 71, 89, 162, 310/163, 66, 42, 40 MM, 172, 90; 29/556; 248/669, 674, 675

[56] References Cited

U.S. PATENT DOCUMENTS

| 3,746,269 | 7/1973 | Maier | 241/244 |
| 3,805,102 | 4/1974 | Vockler | 310/91 |
| 4,003,128 | 1/1977 | Dochterman | 310/42 |
| 4,076,196 | 2/1978 | Levine | 248/675 |
| 4,155,020 | 5/1979 | Skare | 310/42 |
| 4,260,125 | 4/1981 | Levine | 310/91 |

FOREIGN PATENT DOCUMENTS

| 504653 | 6/1951 | Belgium | 310/91 |
| 2327665 | 10/1975 | France | 310/91 |

Primary Examiner—R. Skudy
Attorney, Agent, or Firm—Ladas & Parry

[57] ABSTRACT

A universally mountable motor comprises an armature having first and second opposite faces and defining a cylindrical bore. First and second bearing brackets which span the bore are secured to the armature at the first and second faces respectively. Bearings mounted in the brackets define a common axis of rotation which is coaxial with the bore. A rotor is fitted in the bore and is supported by the bearings to rotate in the bore. The first bracket is formed with wings which extend over the first face of the armature on opposite sides of the axis of rotation. Each wing is formed with an elongate retaining slot defining a central axis and having a first region whereby a mounting member can be removably inserted into the slot and at least first and second additional regions which are spaced apart along the central axis of the slot and into which the mounting member can be selectively displaced from the first region to be captively retained in one of the additional regions. The central axes of the retaining slots respectively are inclined to each other and the first additional regions are closer together than the second additional regions.

8 Claims, 5 Drawing Figures

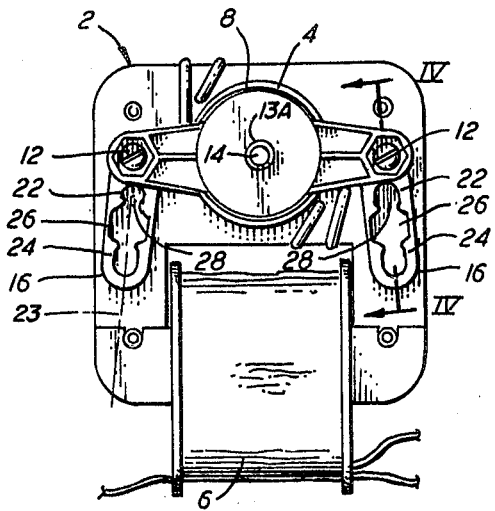
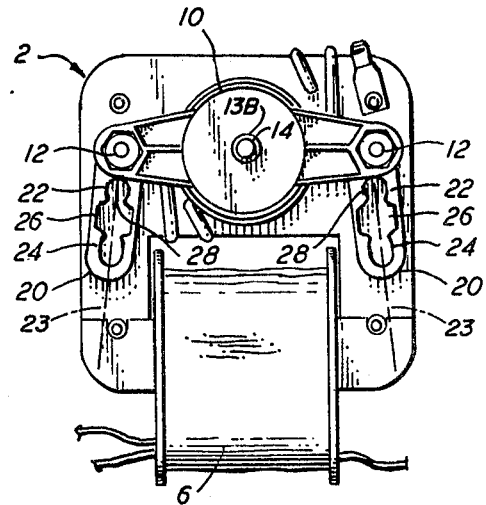
FIG. 1    FIG. 2
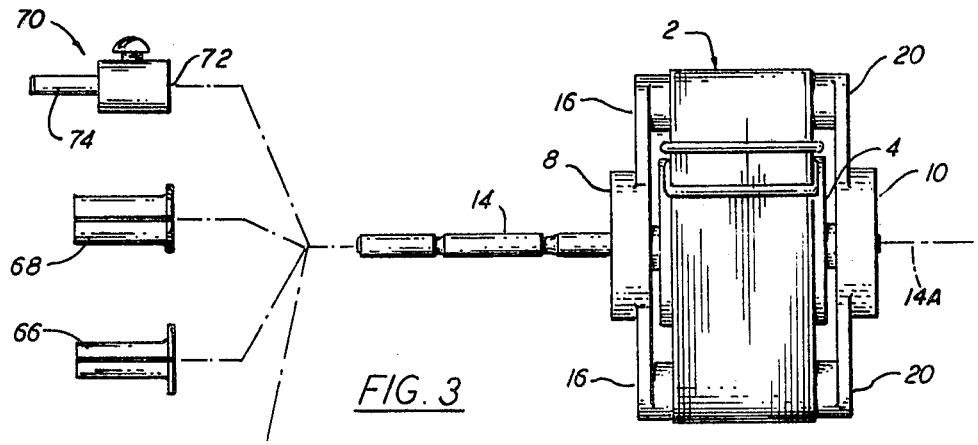
FIG. 3
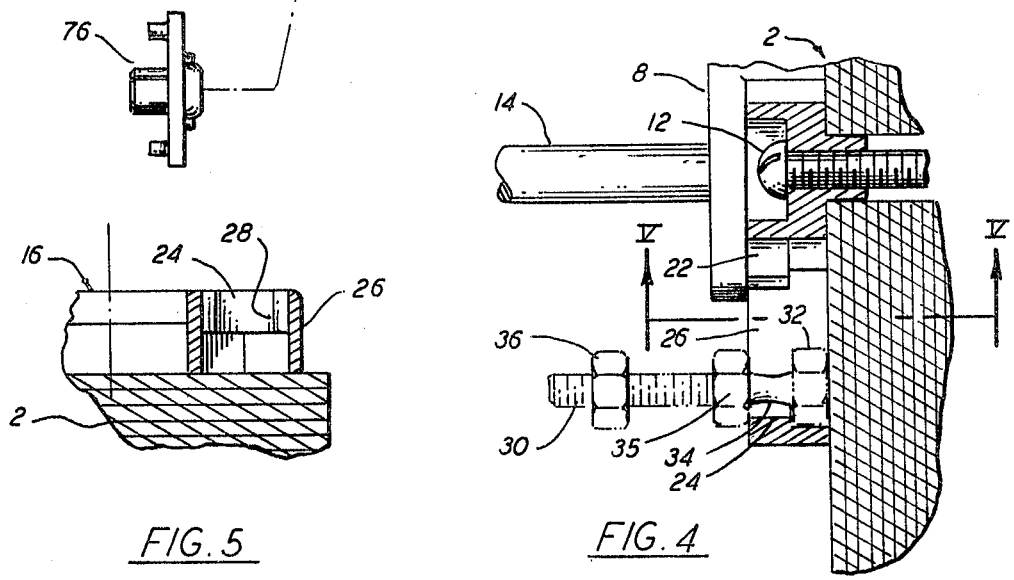
FIG. 5    FIG. 4

UNIVERSALLY MOUNTABLE MOTORS

This invention relates to universally mountable motors.

The conventional refrigeration plant includes an evaporator which is equipped with a fan. The fan is driven by a small electric motor. Although many refrigerator manufacturers employ a fan motor of much the same physical size and having much the same electrical and drive characteristics, the different manufacturers employ different systems for mounting the fan motor in the refrigerator. This presents a difficulty to suppliers of replacement parts, in that while the fan motor of one refrigerator may be of substantially the same size and have substantially the same electrical and mechanical characteristics as the fan motor of another manufacturer's refrigerator, the difference in mounting systems precludes interchangability of the motors. Consequently, replacement part manufacturers produce fan motors having mounting brackets which render the motors universally mountable. By universally mountable is meant that the motor is compatible with at least two different mounting systems. U.S. Pat Nos. 3,746,269 and 4,076,196 relate to universally mountable motors.

According to the present invention there is provided a universally mountable motor comprising an armature having first and second opposite faces and defining a cylindrical bore, first and second bearing brackets secured to the armature at the first and second faces respectively and spanning the bore, bearing means mounted in the first and second bearing brackets and defining a common axis of rotation which is coaxial with the bore, and a rotor fitted in the bore and supported by the bearing means to rotate in the bore, at least said first bracket being formed with wings which extend over said first face of the armature on opposite sides of said axis, each wind being formed with an elongate retaining slot defining a central axis and having a first region whereby a mounting member can be removably inserted into the slot and at least first and second additional regions which are spaced apart along said central axis and into which the mounting member can be selectively displaced from said first region to be captively retained in one of said additional regions, the central axes of the retaining slots respectively being inclined to each other and said first additional regions being closer together than said second additional regions.

For a better understanding of the invention, and to show how the same may be carried into effect, reference will now be made, by way of example, to the accompanying drawings in which:

FIG. 1 is front elevation of a universally mountable motor;

FIG. 2 is a rear elevation of the motor;

FIG. 3 is a top plan view of the motor showing mounting accessories exploded therefrom;

FIG. 4 is an enlarged, partly cut-away, sectional view taken on the line IV—IV of FIG. 1 and showing a mounting accessory; and FIG. 5 is a view taken on the line V—V of FIG. 4.

The illustrated motor comprises the conventional laminated armature 2 formed with a bore in which a rotor 4 is mounted and provided with a coil 6. The coil has two windings, for use with 115 volts AC supply and 230 volts AC supply respectively. The two windings have a common terminal W, and additional terminals B and R are associated with the 115 volt winding and the 230 volt winding respectively. Bearing brackets 8 and 10 of die cast aluminum alloy are secured to the armature 2 at the front and rear thereof by means of bolts 12 which extend through the front bracket 8, the armature 2 and the rear bracket 10 and project to the rear of the motor. Each of the brackets 8 and 10 spans the bore of the armature and incorporates a bearing in which the shaft 14 of the rotor is fitted.

The front bearing bracket 8 has two wings 16 which extend downwardly from the bolts 12 along the front face of the armature. The rear bracket 10 is also provided with wings 20, extending along the rear face of the armature. It will be noted that each wing is formed with a slot which defines a central axis 23 which is narrower at its two end regions 22,24 than at its middle region 26, and is undercut at its two end regions. Each slot end region 22,24 is part circular, and is connected to the middle region 26 by a narrow region 28. The middle region 26 has parallel sides. The slots of each pair diverge in the downward direction, so that the centers of the lower end regions 24 are further apart (2 inch) than the centers of the upper end regions 22 (1.88 inch).

The illustrated motor is designed as a replacement evaporator fan motor for refrigeration plants for large display cabinets in commercial establishments such as delicatessens. The manufacturers of several such plants provide a mounting system for the fan motor which comprises a support member against which the motor is mounted. In some systems, the support member is at the front of the motor whereas in others it is at the rear of the motor. The motor is held in place by a pair of bolts which extend from the armature, to the front or rear depending on the mounting system, through holes in the support member. The holes in the support member are on 2 inch centers in some systems and on 1⅞ (1.88) inch centers in others. The illustrated motor is designed to be usable in all systems. Thus, the motor is provided with two bolts 30 each of which has a hexagonal head 32. The bolts are sized to that their heads can be inserted into the middle regions 26 of the slots of the front bracket (as shown) or the rear bracket. Each bolt is threaded over most of its length but has adjacent the head an unthreaded portion 34 of diameter substantially equal to the width of the narrow regions 28. Thus, when the head of a bolt has been inserted into the middle region of one of the slots, the unthreaded portion 34 can be snapped through one of the narrow regions 28, up into the end region 22 or down into the end region 24 (as shown). When the unthreaded portions 34 are in the end regions 24, the bolts of each pair are on 2 inch centers whereas when the unthreaded portions 34 are in the end regions 22 the bolts of each pair are on 1⅞ inch centers. The bolts are held in position in the slots by means of nuts 35, and additional nuts 36 are used for securing the bolts in position in the holes of the support member (not shown).

It will be understood that the bolt heads can be inserted in the middle regions of the appropriate slots, and snapped into the end regions 22 or 24, without its being necessary to remove either of the bearing brackets from the armature.

The shaft 14 of the illustrated motor has a diameter of 3/16 (0.187) inch and is supported in bearings 13A and 13B in brackets 8 and 10 respectively to define a common axis of rotation 14A which is coaxial with the bore in armature 2. The motor can be used to replace a motor having a ¼ inch or 5/16 inch diameter shaft by fitting a sleeve 66 or 68, having a ¼ inch or 5/16 inch external diameter, onto the shaft. Alternatively, the motor can be used to replace a motor having a shaft diameter of 0.181 inch by fitting an adaptor 70, having a 0.187 inch bore 72 and a 0.181 inch diameter stub 74, onto the shaft. The motor is also provided with a hub adaptor 76 for use with hubless rotors.

It will be appreciated that the invention is not restricted to the specific motor which has been described and illustrated, since variations may be made therein without departing from the invention as defined in the appended claims. For example, the bearing brackets need not be made of die cast metal but could be made other suitable material, such as injection molded plastic material. The slots need not diverge in the downward direction, but could converge instead. The wings themselves could be parallel.

We claim:

1. A universally mountable motor comprising an armature having first and second opposite faces and defining a cylindrical bore, first and second bearing brackets secured to the armature at the first and second faces respectively and spanning the bore, bearing means mounted in the first and second bearing brackets and defining a common axis of rotation which is coaxial with the bore, and a rotor fitted in the bore and supported by the bearing means to rotate in the bore, at least said first bracket being formed with wings which extend over said first face of the armature on opposite sides of said axis, each wing being formed with an elongate retaining slot defining a central axis and having a first region whereby a mounting member can be removably inserted into the slot and at least first and second additional regions which are spaced apart along said central axis and into which the mounting member can be selectively displaced from said first region to be captively retained in one of said additional regions, the central axes of the retaining slots respectively being inclined to each other and said first additional regions being closer together than said second additional regions.

2. A motor as claimed in claim 1, wherein the central axes of the retaining slots are coplanar and said common axis of rotation lies in the plane perpendicular to the common plane of the central axis which plane bisects the angle between said central axes.

3. A motor as claimed in claim 1 or 2, wherein said second bracket is formed with wings which extend over the second face of the armature on opposite sides of said common axis, and the wings of said second bracket are each formed with an elongate retaining slot defining a central axis and having a first region whereby a mounting member can be removably inserted into the slot and at least first and second additional regions which are spaced apart along said central axis and into which the mounting member can be selectively displaced from said first region to be captively retained in one of said additional regions.

4. A motor as claimed in claim 1, wherein the mounting member is a bolt having a head, and the first region of the slot is dimensioned to permit the head of the bolt to be inserted into the slot whereas the additional regions of the slot are undercut so that when the bolt is displaced into one of said additional regions it cannot be removed except by way of said first region.

5. A motor as claimed in claim 1 or 4, wherein each retaining slot consists of first and second additional regions and said first region is disposed between said first and second additional regions.

6. A motor as claimed in claim 1 in which the slots contain narrow regions between the first region and said additional regions, said narrow regions being of a width such that the mounting member must be snapped into said additional regions.

7. A motor as claimed in claim 1, wherein the wings and the bracket are formed integrally of a single member.

8. A motor as claimed in claim 1, wherein the additional regions are sized and shaped so that the mounting member is retained without the use of any additional retaining means.

* * * * *